(12) United States Patent
D et al.

(10) Patent No.: US 8,043,054 B2
(45) Date of Patent: Oct. 25, 2011

(54) METHOD AND SYSTEM FOR MONITORING WIND TURBINE

(75) Inventors: Mallikarjuna Reddy D, Andhra Pradesh (IN); Sujan Kumar Pal, State-Tripura (IN); Narasimhamurthy Raju Nadampalli, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/868,312

(22) Filed: Aug. 25, 2010

(65) Prior Publication Data

US 2011/0142621 A1  Jun. 16, 2011

(51) Int. Cl.
*F03D 11/00* (2006.01)

(52) U.S. Cl. .......... 416/1; 416/35; 416/41; 416/61; 416/174; 415/26; 415/48; 415/112; 415/114; 415/118; 290/44; 290/55

(58) Field of Classification Search .......... 415/26, 415/49, 48, 110, 111, 112, 113, 114, 118, 415/119; 416/1, 40, 35, 41, 43, 44, 61, 174; 29/44, 55

See application file for complete search history.

(56) References Cited

U.S. PATENT DOCUMENTS

| | | | |
|---|---|---|---|
| 6,785,637 | B1 | 8/2004 | Wobben |
| 6,966,754 | B2 | 11/2005 | Wobben |
| 2007/0140847 | A1* | 6/2007 | Romo et al. .......... 416/11 |
| 2008/0164091 | A1 | 7/2008 | Kerber |
| 2009/0039650 | A1 | 2/2009 | Nies |
| 2010/0011862 | A1 | 1/2010 | Kuhlmeier |
| 2010/0133819 | A1 | 6/2010 | Kinzie et al. |
| 2010/0138267 | A1* | 6/2010 | Vittal et al. .......... 290/44 |
| 2010/0143117 | A1 | 6/2010 | Xiong |
| 2010/0143119 | A1 | 6/2010 | Kooijman et al. |

FOREIGN PATENT DOCUMENTS

| | | |
|---|---|---|
| DE | 10065314 B4 | 8/2007 |
| EP | 1092964 B1 | 5/2000 |
| EP | 1760311 A2 | 3/2007 |
| WO | 2007085259 A1 | 8/2007 |

* cited by examiner

*Primary Examiner* — Igor Kershteyn
(74) *Attorney, Agent, or Firm* — James McGinness, Esq.; Armstrong Teasdale LLP

(57) ABSTRACT

A monitoring system for a wind turbine includes at least one acoustic sensor configured to measure an acoustic emission generated by at least one component of the wind turbine, and a control system configured to calculate at least one wear characteristic of the component based on the measured acoustic emission. The wear characteristic includes at least one of a current amount of wear on the component, a rate of wear on the component, and a predicted amount of wear on the component.

19 Claims, 6 Drawing Sheets

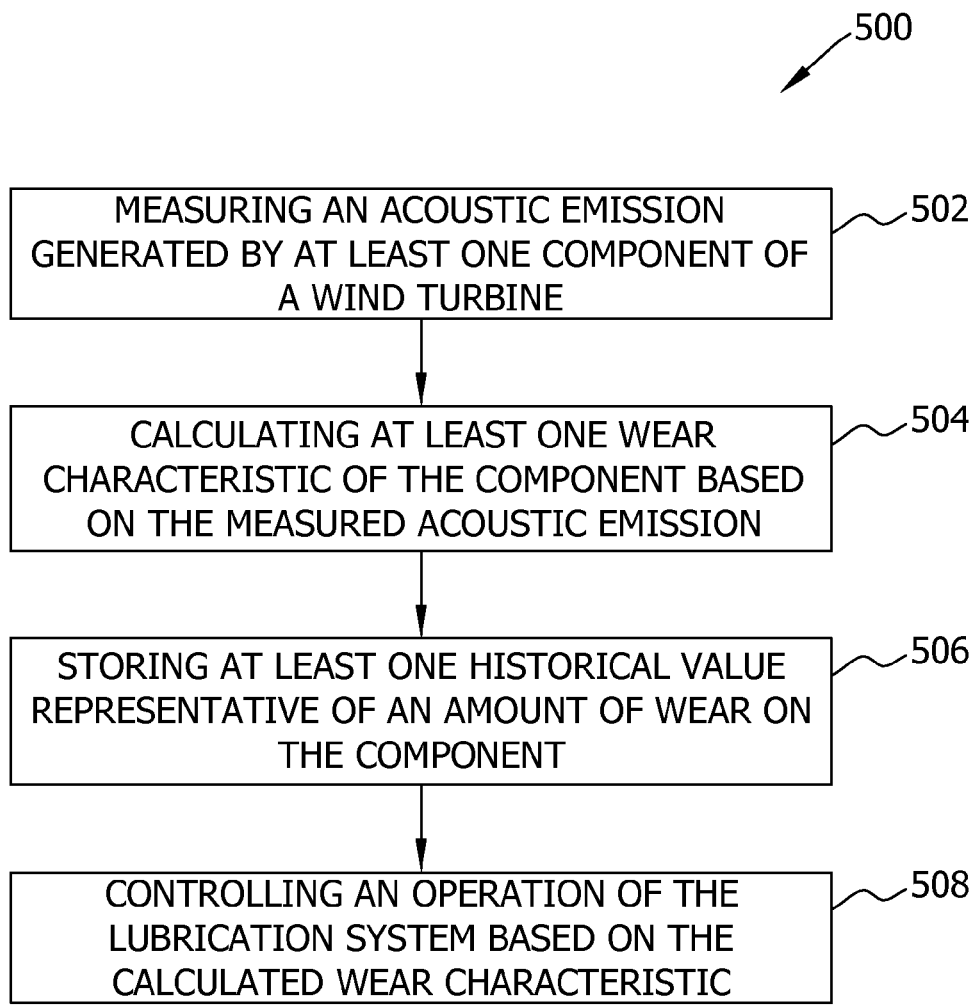

US 8,043,054 B2

METHOD AND SYSTEM FOR MONITORING WIND TURBINE

BACKGROUND OF THE INVENTION

The subject matter described herein relates generally to wind turbines and, more particularly, to a method and system for monitoring a wind turbine.

Generally, a wind turbine includes a rotor that includes a rotatable hub assembly having multiple rotor blades. The rotor blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a tower.

At least some known wind turbines include one or more components, such as bearings, gears, and/or rotor blades that may become worn down or damaged over time. To detect such component damage, known wind turbines often include a monitoring system that measures vibrations generated by the component during an operation of the wind turbine. Such monitoring systems may be complex and/or may require significant computational resources to extract component damage information from the measured vibrations.

BRIEF DESCRIPTION OF THE INVENTION

In one embodiment, a monitoring system for a wind turbine is provided that includes at least one acoustic sensor configured to measure an acoustic emission generated by at least one component of the wind turbine, and a control system configured to calculate at least one wear characteristic of the component based on the measured acoustic emission. The wear characteristic includes at least one of a current amount of wear on the component, a rate of wear on the component, and a predicted amount of wear on the component.

In another embodiment, a monitoring system for a wind turbine is provided that includes at least one acoustic sensor configured to measure an acoustic emission generated by at least one component of the wind turbine, and a control system configured to calculate at least one wear characteristic of the component based on the measured acoustic emission. The wear characteristic includes at least one of a current amount of wear on the component, a rate of wear on the component, and a predicted amount of wear on the component, wherein the control system is configured to at least one of control an operation of the wind turbine and transmit the wear characteristic to a data processing system.

In yet another embodiment, a method of monitoring a wind turbine is provided that includes measuring an acoustic emission generated by at least one component of the wind turbine, and calculating at least one wear characteristic of the component based on the measured acoustic emission. The wear characteristic includes at least one of a current amount of wear on the component, a rate of wear on the component, and a predicted amount of wear on the component.

BRIEF DESCRIPTION OF THE DRAWINGS

FIG. 6 is a flow diagram of an exemplary method of monitoring a wind turbine suitable for use with the monitoring system shown in FIG. 3.

DETAILED DESCRIPTION OF THE INVENTION

As described herein, a monitoring system measures one or more acoustic emissions generated by a component of a wind turbine and generates a signal representative of the measured acoustic emissions. In one embodiment, the monitoring system calculates a zero crossing amplitude, a zero crossing peak amplitude, a zero crossing rate, an acoustic energy amplitude and/or an acoustic energy frequency of the signal based on a measured rotational speed of a rotor, a component geometry parameter, and the signal. The zero crossing amplitude, the zero crossing peak amplitude, the zero crossing rate, the acoustic energy amplitude and/or the acoustic energy frequency are used to determine one or more wear characteristics of the component, such as a current amount of wear on the component, a rate of wear on the component, and/or a future or predicted amount of wear on the component. The current amount of wear, the wear rate, and/or the predicted amount of wear may be used to control an operation of the wind turbine. For example, an operation of a lubrication system may be controlled based on the current amount of wear, the wear rate, the predicted amount of wear, and/or based on a measured lubrication fluid temperature.

Figure 1:
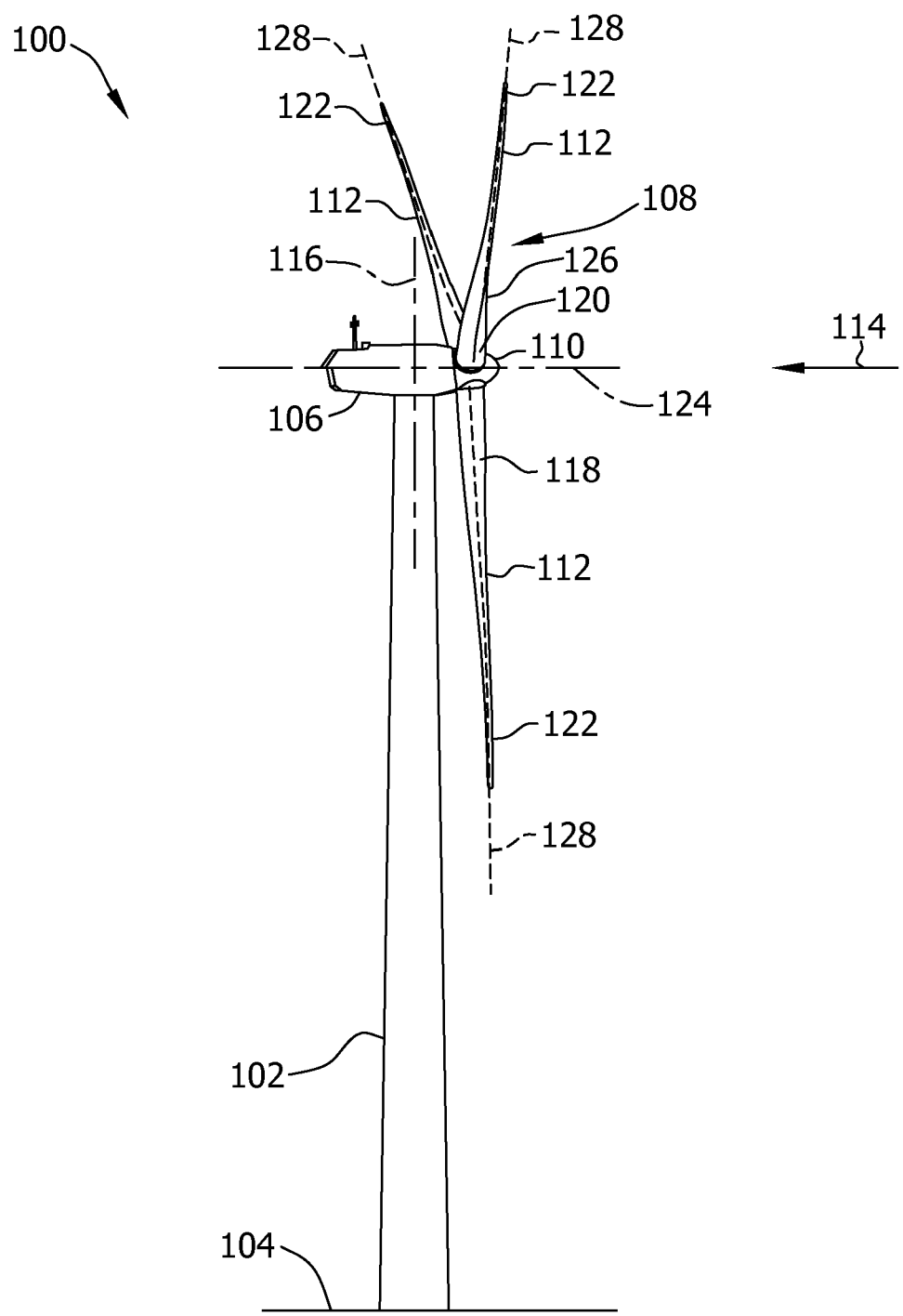
FIG. 1 is a perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
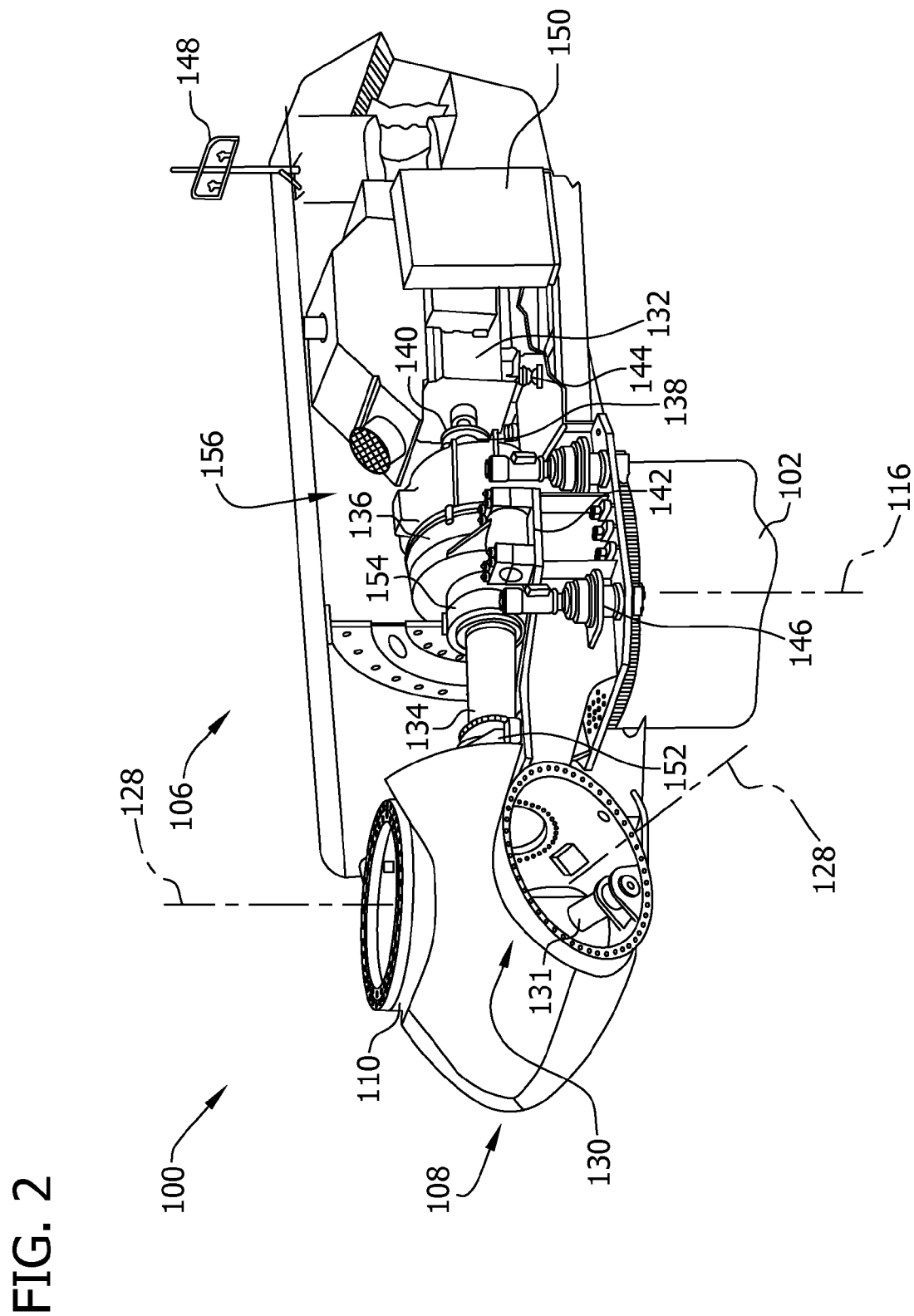
FIG. 2 is a partial sectional view of an exemplary nacelle suitable for use with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 128. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 to control the perspective of rotor blades 112 with respect to the direction of wind 114. Nacelle 106 also includes at least one meteorological mast 148 that includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
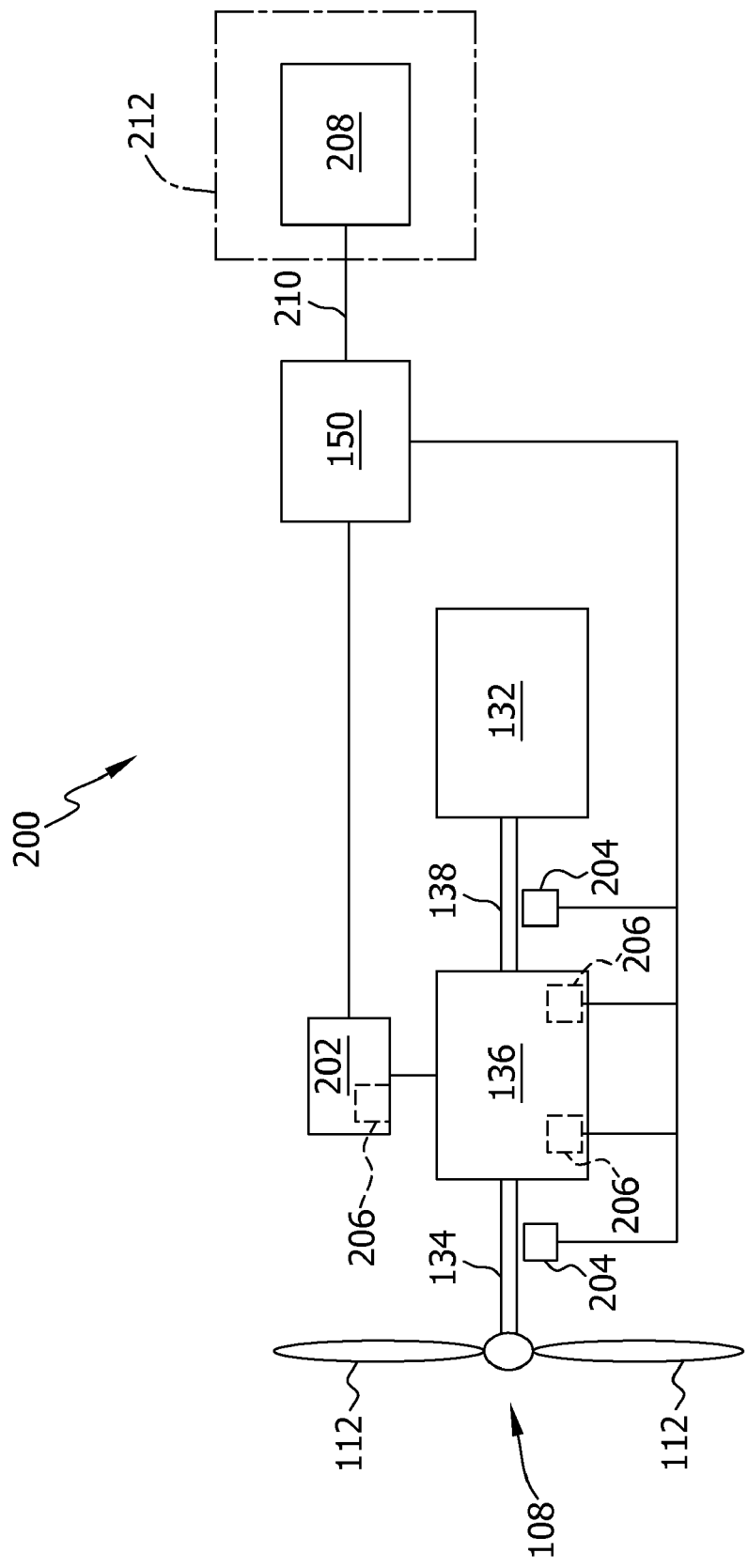
FIG. 3 is a schematic view of an exemplary monitoring system suitable for use with the wind turbine shown in FIG. 1.

FIG. 3 is a schematic diagram of an exemplary monitoring system 200 suitable for use with wind turbine 100 (shown in FIG. 1). Components of monitoring system 200 that are identical or similar to components of wind turbine 100 are labeled with the same reference numerals. In the exemplary embodiment, monitoring system 200 includes a lubrication system 202, at least one acoustic sensor 204, at least one temperature sensor 206, and a data processing system 208. Monitoring system 200 monitors an operation of lubrication system 202 and/or monitors a rate of wear (or "wear rate") of one or more components of wind turbine 100, such as forward support bearing 152 and/or aft support bearing 154, yaw drive mechanism 146 (all shown in FIG. 2), one or more pitch bearings, a braking system, one or more blowers, one or more fans (none shown) and/or any suitable component of drive train 156 and/or wind turbine 100. As used herein, the term "wear" refers to an erosion, an abrasion, and/or a deterioration of the component of wind turbine 100 and/or damage to the component of wind turbine 100, as a result of environmental conditions and/or friction induced by an operation of wind turbine 100.

In the exemplary embodiment, lubrication system 202 is coupled to gearbox 136 and to turbine control system 150. Lubrication system 202 supplies a lubrication fluid, such as oil and/or any suitable fluid, to gearbox 136 based on one or more signals received from turbine control system 150. The lubrication fluid reduces frictional contact and/or abrasion between components of wind turbine 100, such as, for example, between one or more bearings and bearing supporting structures (neither shown) within gearbox 136. Alternatively or additionally, lubrication system 202 supplies lubrication fluid to other suitable components and/or systems of wind turbine 100.

Monitoring system 200 includes one or more acoustic sensors 204 that are positioned on and/or near wind turbine 100, such as within nacelle 106 (shown in FIG. 1). More specifically, in the exemplary embodiment, a plurality of acoustic sensors 204 are coupled to and/or positioned proximate to gearbox 136, forward support bearing 152, aft support bearing 154, yaw drive mechanism 146 (shown in FIG. 2), generator 132, rotor shaft 134, high speed shaft 138, and/or any suitable component on or within nacelle 106 and/or wind turbine 100. In the exemplary embodiment, each acoustic sensor 204 measures acoustic emissions generated by one or more components within nacelle 106 and/or wind turbine 100, such as the components coupled to and/or positioned proximate to acoustic sensors 204. Moreover, each acoustic sensor 204 generates and transmits a signal representative of the measured acoustic emissions (hereinafter referred to as an "acoustic signal") to turbine control system 150 and/or any suitable system. As such, in contrast to known vibration sensors that measure an amount of vibration or displacement in a component, acoustic sensors 204 measure an acoustic energy generated by a component. Such acoustic energy may travel through air and/or through another suitable fluid in the form of one or more sound and/or pressure waves.

In the exemplary embodiment, monitoring system 200 also includes one or more temperature sensors 206 that are positioned on or within nacelle 106 and/or wind turbine 100. More specifically, in the exemplary embodiment, a plurality of temperature sensors 206 are positioned within and/or coupled to lubrication system 202 and/or gearbox 136 to measure a temperature of the lubrication fluid. Alternatively, temperature sensors 206 are positioned in any suitable location within nacelle 106 and/or wind turbine 100 that enables temperature sensors 206 to measure the temperature of the lubrication fluid. In the exemplary embodiment, each temperature sensor 206 generates and transmits a signal representative of the measured lubrication fluid temperature (hereinafter referred to as a "temperature signal") to turbine control system 150 and/or any suitable system.

As described more fully herein, turbine control system 150 processes one or more acoustic signals received from one or more acoustic sensors 204 to determine an amount of wear exhibited by one or more components of wind turbine 100. Moreover, turbine control system 150 processes one or more temperature signals received from one or more temperature sensors 206 to determine and/or monitor a status of lubrication system 202, such as a temperature, a viscosity level, and/or an effectiveness of the lubrication fluid. Turbine control system 150 controls an operation of lubrication system 202 and/or controls an operation of wind turbine 100 based on the processed acoustic signal and/or the processed temperature signal.

In the exemplary embodiment, turbine control system 150 is coupled in signal communication with a data processing system 208 by a data bus 210, as shown in FIG. 3. In the exemplary embodiment, data processing system 208 is a computer or server located remotely from wind turbine 100, such as within a wind farm control center 212. Alternatively, data processing system 208 is positioned in any suitable location. Data bus 210 is a supervisory control and data acquisition (SCADA) bus or any suitable bus and/or data conduit. In the exemplary embodiment, turbine control system 150 transmits signals, such as the temperature signal, the acoustic signal, one or more signals representative of historical values of the temperature signal, one or more signals representative of historical values of the acoustic signal, and/or any suitable signal to data processing system 208. Data processing system 208 stores data from the signals in a memory (not shown) and/or displays the data to a user on a display (neither shown). The data may be displayed on one or more charts, graphs, waveforms, tables, and/or any suitable arrangement of graphics and/or text. In the exemplary embodiment, data processing system 208 also transmits control signals to turbine control system 150 to control an operation of lubrication system 202 and/or an operation of wind turbine 100 based on the signals received. Moreover, data processing system 208 may transmit signals to and/or receive signals from other wind turbines similar to wind turbine 100. In one embodiment, data processing system 208 may compare signals from various wind turbines and/or may control an operation of one or more wind turbines, such as wind turbine 100, based on signals received from other wind turbines.

In the exemplary embodiment, turbine control system 150 and/or data processing system 208 may correlate acoustic signal data with temperature signal data to make intelligent determinations regarding operation of lubrication system 202 and/or regarding operation of wind turbine 100. For example, the historical temperature data may indicate a historical viscosity of the lubrication fluid. The historical acoustic data may indicate a historical rate of wear of one or more components of wind turbine 100. Turbine control system 150 and/or data processing system 208 may correlate the historical temperature data with the historical acoustic data to optimize cooling of lubrication system 202, to optimize a replacement cycle of the lubrication fluid, to optimize circulation of the lubrication fluid, and/or to optimize and/or adjust any other suitable aspect of lubrication system 202 and/or wind turbine 100.

Figure 4:
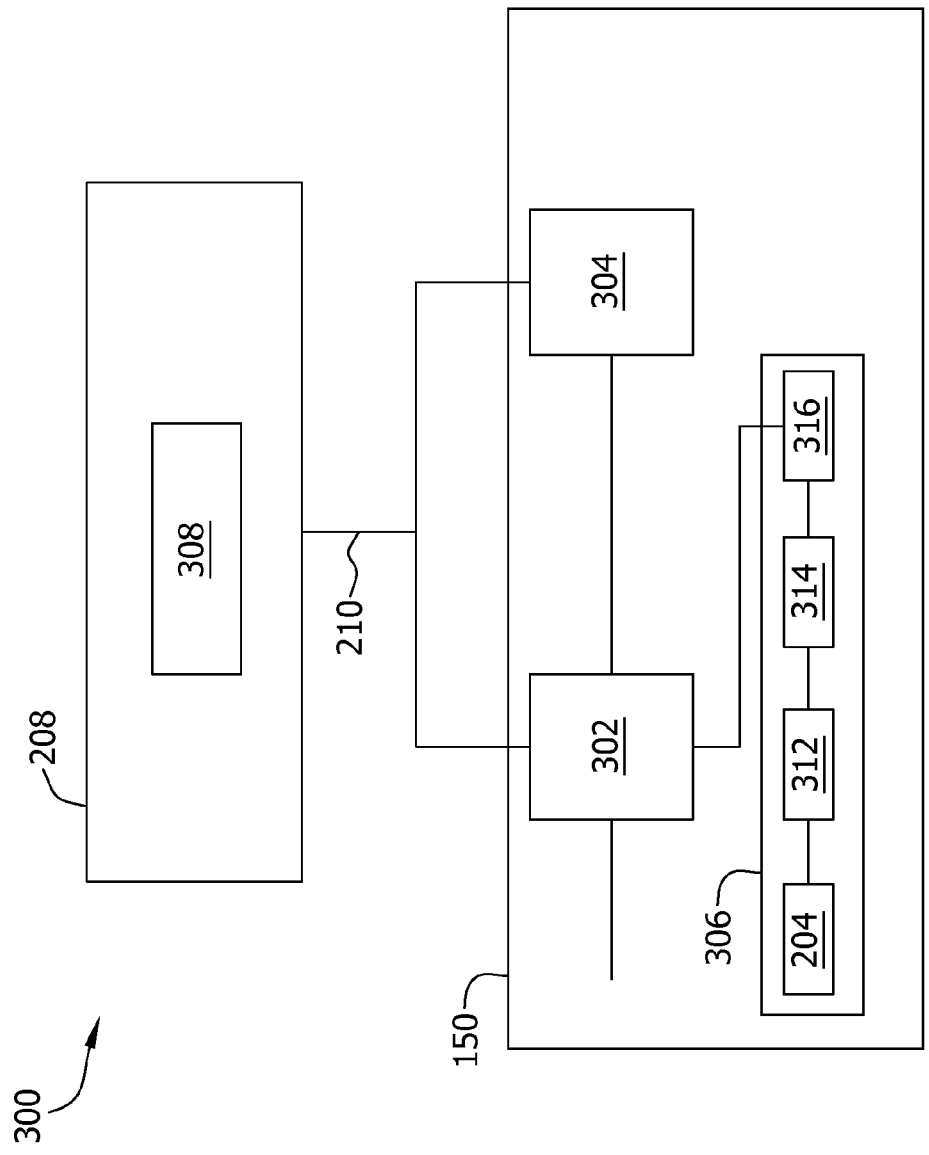
FIG. 4 is a schematic diagram of an exemplary acoustic signal processing system suitable for use with the monitoring system shown in FIG. 3.

FIG. 4 is a block diagram of an exemplary acoustic signal processing system 300 suitable for use with monitoring system 200 (shown in FIG. 3). In the exemplary embodiment, acoustic signal processing system 300 is at least partially implemented by a control system, such as turbine control system 150 and/or data processing system 208. More specifically, in the exemplary embodiment, an interface module 302, a wear diagnosis module 304, and a signal processing module 306 are implemented by turbine control system 150, and a database 308 is implemented by data processing system 208. Alternatively, one or more components of acoustic signal processing system 300 are implemented by any suitable system.

In the exemplary embodiment, interface module 302 receives at least one input from one or more sensors, from one or more data files, and/or from one or more parameters (none shown) stored in turbine control system 150, data processing system 208, and/or any system coupled to interface module 302. More specifically, in the exemplary embodiment, interface module 302 receives a value representative of a rotational speed of rotor 108 (hereinafter referred to as a "rotor speed value"), a value or parameter representative of a geometry of one or more bearings or other suitable components that are monitored by acoustic sensor 204 (shown in FIG. 3) (hereinafter referred to as a "component geometry parameter"), such as one or more bearings (not shown) within gearbox 136, one or more gears within pitch assembly 130 (shown in FIG. 2), forward support bearing 152, aft support bearing 154, and/or any suitable component.

In the exemplary embodiment, signal processing module 306 is operatively coupled to acoustic sensor 204, an amplifier module 312, a filter module 314, and a converter module 316. An acoustic signal is generated by acoustic sensor 204 and is amplified by amplifier module 312 to increase an amplitude of the acoustic signal to a suitable level. Amplifier module 312 transmits an amplified acoustic signal to filter module 314 that filters one or more frequencies from the amplified acoustic signal. In the exemplary embodiment, filter module 314 includes a band-pass filter that is tuned to a frequency of interest, such as an acoustic frequency of the component that is monitored by acoustic sensor 204 (hereinafter referred to as the "monitored component"). In one embodiment, the frequency of interest may be selected using a look-up table or another suitable reference such that a specific component may be monitored. The filtered acoustic signal is transmitted to converter module 316 that converts the filtered acoustic signal to a digital acoustic signal. The digital acoustic signal is transmitted to interface module 302 for processing with the rotor speed value, the component geometry parameter, and/or with any suitable input received by interface module 302.

As described more fully herein, interface module 302 processes the digital acoustic signal, the rotor speed value, the component geometry parameter, and/or any suitable input received to determine a wear characteristic, such as an amount of wear on or induced to the component. Interface module 302 generates and transmits a signal representative of a determined amount of wear (hereinafter referred to as a "determined wear level") to a wear diagnosis module 304. In the exemplary embodiment, wear diagnosis module 304 determines a second wear characteristic, such as a wear rate of the monitored component based on the determined wear level. More specifically, wear diagnosis module 304 analyzes the determined wear level over a suitable period of time to determine a wear rate of the monitored component. The determined wear rate and/or the determined wear level are transmitted to data processing system 208 and may be used to control operation of lubrication system 202 (shown in FIG. 3) and/or to control operation of wind turbine 100, as described above. Moreover, the determined wear rate and/or the determined wear level are transmitted to database 308 through data bus 210 (shown in FIG. 3) for storage and/or for future analysis.

Figure 5:
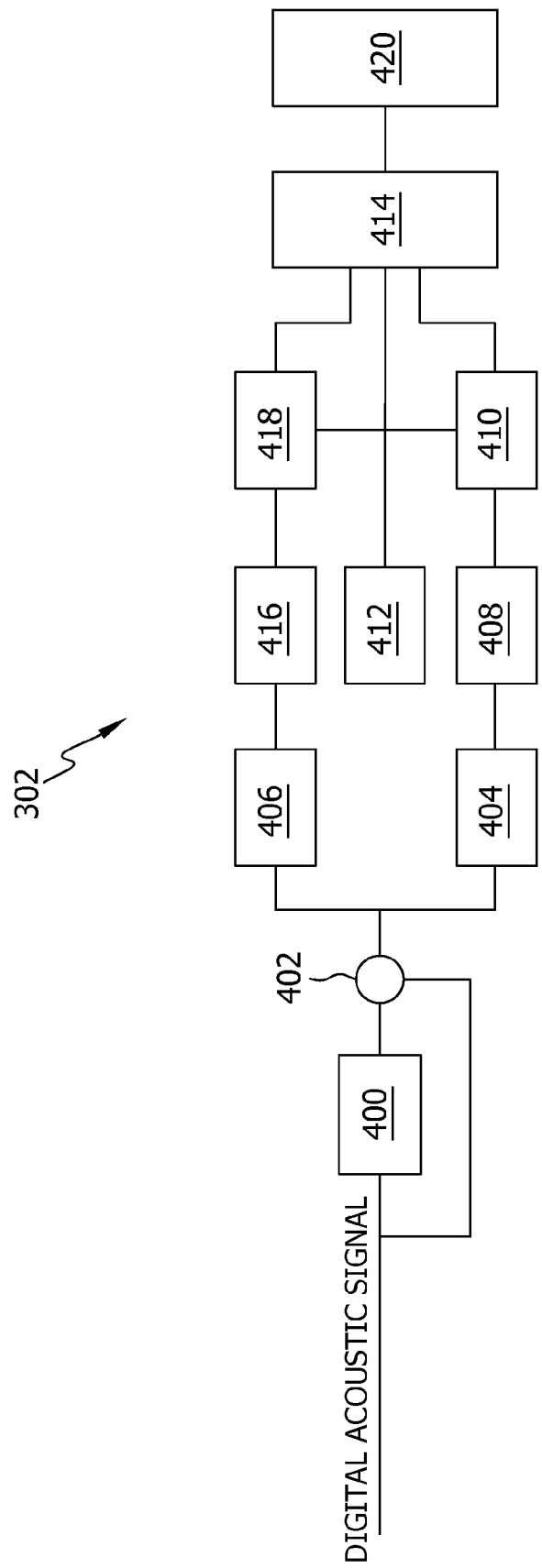
FIG. 5 is a schematic diagram of an exemplary interface module suitable for use with the acoustic signal processing system shown in FIG. 4.

FIG. 5 is a schematic view of interface module 302. In the exemplary embodiment, interface module 302 includes a smoothing module 400 that receives the digital acoustic signal described above with reference to FIG. 4. Smoothing module 400 calculates a median value of the digital acoustic signal and transmits the calculated median value to a subtraction module 402. Subtraction module 402 subtracts the calculated median value from the value of the digital acoustic signal to reduce an impact of interruptions and/or discontinuities of the digital acoustic signal on the calculation of the wear level. The digital acoustic signal is then transmitted to a zero crossing calculation module 404 and/or to an energy calculation module 406.

Zero crossing calculation module 404 calculates a number of "zero crossings" (i.e., a number of times that a polarity of the digital acoustic signal changes) within a predefined time to determine a zero crossing rate (i.e., a zero crossing frequency). A signal representative of the zero crossing rate is transmitted to a correlation module 408 that compares the zero crossing rate of the current acoustic signal to a zero crossing rate of one or more previous acoustic signals. A correlated zero crossing signal is transmitted from correlation module 408 to a zero crossing peak evaluation module 410 that determines a maximum value and a minimum value of the correlated zero crossing signal that are centered around a suitable defect frequency of the monitored component. The defect frequency of the monitored component is transmitted to zero crossing peak evaluation module 410 by a component analysis module 412 that calculates the defect frequency based on the rotor speed value and the component geometry parameter described above with reference to FIG. 4. Zero crossing peak evaluation module 410 calculates a difference between the maximum values and the minimum values of the correlated zero crossing signal to determine an amplitude of each zero crossing (hereinafter referred to as a "zero crossing amplitude") and/or to determine a maximum amplitude of all zero crossings within the specified time period (hereinafter referred to as a "zero crossing peak amplitude"). Moreover, zero crossing peak evaluation module 410 calculates a frequency of zero crossings (i.e., a "zero crossing rate"). Zero crossing peak evaluation module 410 transmits signals representative of the zero crossing amplitude, the zero crossing peak amplitude, and/or the zero crossing rate to a frequency interpretation module 414.

Energy calculation module 406 calculates an amount of energy represented by the digital acoustic signal (i.e., an "acoustic energy") within a specified time. A signal representative of the acoustic energy is transmitted to a correlation module 416 that compares the acoustic energy of the current acoustic signal to an amount of acoustic energy of one or more previous acoustic signals. A correlated acoustic energy signal is transmitted from correlation module 416 to an energy peak evaluation module 418 that determines a maximum value and a minimum value of the correlated acoustic energy signal that are centered around the defect frequency of the monitored component received from component analysis module 412. Energy peak evaluation module 418 calculates a difference between the maximum values and the minimum values of the correlated acoustic energy signal to determine an amplitude of the acoustic energy (hereinafter referred to as an "acoustic energy amplitude"). Energy peak evaluation module 418 generates and transmits signals representative of the acoustic energy amplitude and/or a frequency of the correlated acoustic energy signal (hereinafter referred to as an "acoustic energy frequency") to frequency interpretation module 414.

In the exemplary embodiment, frequency interpretation module 414 compares the zero crossing rate and/or the acoustic energy frequency to one or more predefined defect frequencies to determine whether the monitored component is defective and/or to determine whether a defect frequency of the monitored component has changed with respect to one or more previous defect frequencies.

A pattern recognition module 420 is coupled to frequency interpretation module 414 to calculate the determined wear level of the monitored component. More specifically, pattern recognition module 420 may calculate a wear level by comparing the zero crossing amplitude, the zero crossing peak amplitude, the zero crossing rate, the acoustic energy amplitude and/or the acoustic energy frequency with previously stored values, such as historical or reference values stored within a lookup table and/or within another suitable structure that correspond to a wear profile of the monitored component. The determined wear level may be set to a difference between the respective values and/or may be set to a suitable combination of the differences between the respective values. Alternatively, pattern recognition module 420 may use a learning algorithm and/or any suitable algorithm to calculate the wear level of the monitored component and/or to calculate a future amount of wear on or that is likely to be induced to the monitored component based on the zero crossing amplitude, the zero crossing peak amplitude, the zero crossing rate, the acoustic energy amplitude and/or the acoustic energy frequency. In one embodiment, one or more land-based and/or offshore wind turbines 100 may calculate a future amount of wear on or that is likely to be induced to one or more components, and may schedule future maintenance events accordingly.

Moreover, pattern recognition module 420 and/or any suitable component of interface module 302 may generate one or more alarm signals if one or more of the determined values exceeds a predefined threshold value. For example, an alarm signal may be generated if the zero crossing peak amplitude exceeds a predefined peak amplitude threshold value, if the acoustic energy amplitude exceeds a predefined acoustic energy threshold value, and/or if the zero crossing amplitudes exceed a predefined noise threshold value a predefined number of times during a predefined period. Alternatively, an alarm signal may be generated if any combination of the zero crossing amplitude, the zero crossing peak amplitude, the zero crossing rate, the acoustic energy amplitude and/or the acoustic energy frequency exceeds any suitable threshold value and/or satisfies any suitable condition. The alarm signals and/or one or more signals representative of the determined wear level may be transmitted to data processing system 208 and/or to other components of turbine control system 150 to control operation of wind turbine 100, lubrication system 202 (shown in FIG. 3), and/or any other suitable component and/or system as describe more fully herein.

FIG. 6 is a flow diagram of an exemplary method 500 of monitoring a wind turbine, such as wind turbine 100 (shown in FIG. 1), that is suitable for use with monitoring system 200 (shown in FIG. 3) and/or with acoustic signal processing system 300 (shown in FIG. 4). In the exemplary embodiment, method 500 includes measuring 502 an acoustic emission generated by at least one component of wind turbine 100. At least one wear characteristic of the component is then calculated 504 based on the measured acoustic emission. In the exemplary embodiment, the wear characteristic includes at least one of a current amount of wear on the component, a rate of wear (or a "wear rate") on the component, and a predicted amount of wear on the component. For example, an amount of wear may be calculated 504 based on the measured acoustic emission and/or based on any other suitable condition, such as based on a measured rotational speed of rotor 108 (shown in FIG. 1) and/or based on a geometry characteristic of the component.

Moreover, in the exemplary embodiment, at least one historical value representative of an amount of wear on the component, or another suitable wear characteristic, is stored 506 in a memory device. A wear rate of the component may also be calculated 504 based on the stored historical value and the calculated amount of wear on the component. In the exemplary embodiment, an operation of a lubrication system, such as lubrication system 202 (shown in FIG. 3), is controlled 508 based on the calculated wear characteristic and/or based on data received from a temperature sensor, such as temperature sensor 206 (shown in FIG. 3).

A technical effect of the system and method described herein includes at least one of: (a) measuring an acoustic emission generated by at least one component of a wind turbine; and (b) calculating at least one wear characteristic of a component based on a measured acoustic emission. In one embodiment, the wear characteristic includes at least one of a current amount of wear on the component, a rate of wear on the component, and a predicted amount of wear on the component.

The above-described embodiments provide an efficient and reliable monitoring system for a wind turbine. The monitoring system measures acoustic emissions generated by a component and calculates at least one wear characteristic based on the measured acoustic emissions. The monitoring system also measures a temperature of a lubrication fluid within a lubrication system. The wear characteristic and the measured lubrication fluid temperature may be used to control the lubrication system to optimize lubrication of one or more components. Moreover, the wear characteristic and the lubrication fluid temperature may be used to predict an operational life of the component and/or to predict an amount of wear on the component. As such, maintenance events may be optimally scheduled and the operational lives of wind turbine components may be extended.

Exemplary embodiments of a wind turbine, a monitoring system, and a method for monitoring a wind turbine are described above in detail. The wind turbine, monitoring system, and method are not limited to the specific embodiments described herein, but rather, components of the wind turbine and/or monitoring system and/or steps of the method may be utilized independently and separately from other components and/or steps described herein. For example, the monitoring system may also be used in combination with other wind turbines and methods, and is not limited to practice with only the wind turbine and method as described herein. Rather, the exemplary embodiments can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system for a wind turbine including a lubrication system, said monitoring system comprising:
at least one acoustic sensor configured to measure an acoustic emission generated by at least one component of the wind turbine; and,
a control system configured to:
calculate at least one wear characteristic of the component based on the measured acoustic emission, the wear characteristic including at least one of a current amount of wear on the component, a rate of wear on the component, and a predicted amount of wear on the component; and,
control an operation of the lubrication system based on the calculated wear characteristic.

2. A monitoring system in accordance with claim 1, further comprising at least one temperature sensor configured to measure a temperature of a lubrication fluid contained within the lubrication system, said control system further configured to control the operation of the lubrication system based on the calculated wear characteristic and based on data received from said temperature sensor.

3. A monitoring system in accordance with claim 1, wherein the wear characteristic is based on at least one of a zero crossing amplitude, a zero crossing peak amplitude, a zero crossing rate, an acoustic energy amplitude and an acoustic energy frequency of a signal representative of the measured acoustic emission.

4. A monitoring system in accordance with claim 1, wherein said control system comprises an interface module configured to calculate at least one of the amount of wear on the component and the predicted amount of wear on the component.

5. A monitoring system in accordance with claim 4, wherein said control system further comprises a wear diagnosis module coupled to said interface module, said wear diagnosis module configured to store at least one historical value representative of an amount of wear on the component.

6. A monitoring system in accordance with claim 5, wherein said wear diagnosis module is further configured to calculate the wear rate of the component based on the stored historical value and the calculated amount of wear on the component.

7. A monitoring system for a wind turbine, said monitoring system comprising:

at least one acoustic sensor configured to measure an acoustic emission generated by at least one component of the wind turbine; and, a control system configured to calculate at least one wear characteristic of the component based on the measured acoustic emission, the wear characteristic including at least one of a current amount of wear on the component, a rate of wear on the component, and a predicted amount of wear on the component, wherein said control system is configured to control an operation of the wind turbine based on the calculated wear characteristic.

8. A monitoring system in accordance with claim 7, wherein the wind turbine includes a lubrication system, said control system further configured to control an operation of the lubrication system based on the calculated wear characteristic.

9. A monitoring system in accordance with claim 8, further comprising at least one temperature sensor configured to measure a temperature of a lubrication fluid contained within the lubrication system, said control system further configured to control the operation of the lubrication system based on the calculated wear characteristic and based on data received from said temperature sensor.

10. A monitoring system in accordance with claim 7, wherein the wear characteristic is based on at least one of a zero crossing amplitude, a zero crossing peak amplitude, a zero crossing rate, an acoustic energy amplitude and an acoustic energy frequency of a signal representative of the measured acoustic emission.

11. A monitoring system in accordance with claim 7, wherein said control system comprises an interface module configured to calculate at least one of the amount of wear on the component and the predicted amount of wear on the component.

12. A monitoring system in accordance with claim 11, wherein said control system further comprises a wear diagnosis module coupled to said interface module, said wear diagnosis module configured to store at least one historical value representative of an amount of wear on the component.

13. A monitoring system in accordance with claim 12, wherein said wear diagnosis module is further configured to calculate the wear rate of the component based on the stored historical value and the calculated amount of wear on the component.

14. A method of monitoring a wind turbine, said method comprising:

measuring an acoustic emission generated by at least one component of the wind turbine;

calculating at least one wear characteristic of the component based on the measured acoustic emission, the wear characteristic including at least one of a current amount of wear on the component, a rate of wear on the component, and a predicted amount of wear on the component; and, controlling an operation of the wind turbine based on the calculated wear characteristic.

15. A method in accordance with claim 14, wherein the wind turbine includes a lubrication system, said method further comprising controlling an operation of the lubrication system based on the calculated wear characteristic.

16. A method in accordance with claim 15, wherein the wind turbine further includes at least one temperature sensor, said method further comprising controlling the operation of the lubrication system based on the calculated wear characteristic and based on data received from the temperature sensor.

17. A method in accordance with claim 14, wherein the wind turbine includes a rotor, said method further comprising calculating an amount of wear on the component based on the measured acoustic emission and based on at least one of a measured rotational speed of the rotor and a geometry characteristic of the component.

18. A method in accordance with claim 17, further comprising storing at least one historical value representative of an amount of wear on the component.

19. A method in accordance with claim 18, further comprising calculating a wear rate of the component based on the stored historical value and the calculated amount of wear on the component.

* * * * *

US008043054C1

(12) EX PARTE REEXAMINATION CERTIFICATE (9590th)
United States Patent
D et al.

(10) Number: US 8,043,054 C1
(45) Certificate Issued: Apr. 10, 2013

(54) METHOD AND SYSTEM FOR MONITORING WIND TURBINE

(75) Inventors: Mallikarjuna Reddy D, Andhra Pradesh (IN); Sujan Kumar Pal, State-Tripura (IN); Narasimhamurthy Raju Nadampalli, Andhra Pradesh (IN)

(73) Assignee: General Electric Company, Schenectady, NY (US)

Reexamination Request:
No. 90/020,015, Sep. 12, 2012

Reexamination Certificate for:
Patent No.: 8,043,054
Issued: Oct. 25, 2011
Appl. No.: 12/868,312
Filed: Aug. 25, 2010

(51) Int. Cl.
*F03D 11/00* (2006.01)

(52) U.S. Cl.
USPC ...... 416/1; 416/35; 416/41; 416/61; 416/174; 415/26; 415/48; 415/112; 415/114; 415/118; 290/44; 290/55

(58) Field of Classification Search .................. None
See application file for complete search history.

(56) References Cited

To view the complete listing of prior art documents cited during the proceeding for Reexamination Control Number 90/020,015, please refer to the USPTO's public Patent Application Information Retrieval (PAIR) system under the Display References tab.

*Primary Examiner* — William Doerrler

(57) ABSTRACT

A monitoring system for a wind turbine includes at least one acoustic sensor configured to measure an acoustic emission generated by at least one component of the wind turbine, and a control system configured to calculate at least one wear characteristic of the component based on the measured acoustic emission. The wear characteristic includes at least one of a current amount of wear on the component, a rate of wear on the component, and a predicted amount of wear on the component.

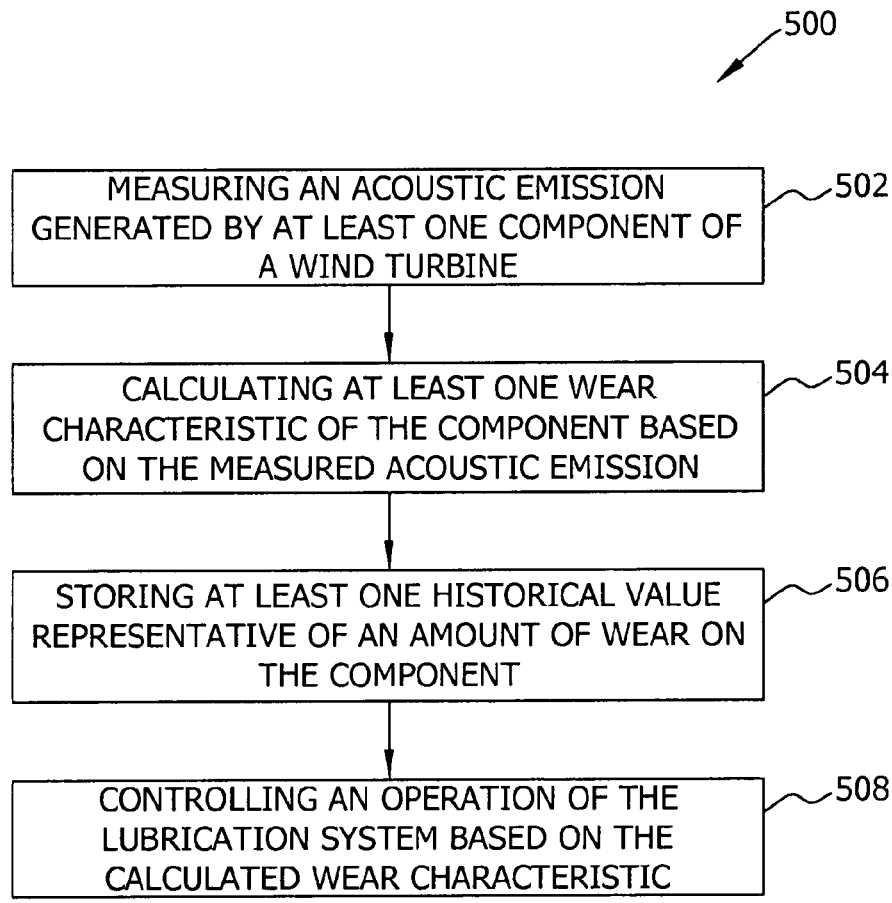

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 7-10 and 14-16 are determined to be patentable as amended.

Claims 4-6, 11-13 and 17-19, dependent on an amended claim, are determined to be patentable.

New claims 20-24 are added and determined to be patentable.

1. A monitoring system for a wind turbine including a lubrication system, said monitoring system comprising:
    at least one acoustic sensor configured to measure an acoustic emission generated by at least one component of the wind turbine; and,
    a control system configured to:
        calculate [at least one wear characteristic] *a plurality of wear characteristics* of the component based on the measured acoustic emission, the wear [characteristic] *characteristics* including [at least one of] a current amount of wear on the component, a rate of wear on the component, and a predicted amount of wear on the component, *the rate of wear on the component being based on the calculated amount of wear on the component over a period of time*; and,
        control an operation of the lubrication system based on the calculated wear [characteristic] *characteristics*.

2. A monitoring system in accordance with claim 1, further comprising at least one temperature sensor configured to measure a temperature of a lubrication fluid contained within the lubrication system, said control system further configured to control the operation of the lubrication system based on the calculated wear [characteristic] *characteristics* and based on data received from said temperature sensor.

3. A monitoring system in accordance with claim 1, wherein the [wear characteristic] *predicted amount of wear on the component* is based on at least one of a zero crossing amplitude, a zero crossing peak amplitude, a zero crossing rate, an acoustic energy amplitude and an acoustic energy frequency of a signal representative of the measured acoustic emission.

7. A monitoring system for a wind turbine, said monitoring system comprising:
    at least one acoustic sensor configured to measure an acoustic emission generated by at least one component of the wind turbine; and,
    a control system configured to calculate [at least one wear characteristic] *a plurality of wear characteristics* of the component based on the measured acoustic emission, the wear [characteristic] *characteristics* including [at least one of] a current amount of wear on the component, a rate of wear on the component, and a predicted amount of wear on the component, *the rate of wear on the*

*component being based on the calculated amount of wear on the component over a period of time*,
    wherein said control system is configured to control an operation of the wind turbine based on the calculated wear [characteristic] *characteristics*.

8. A monitoring system in accordance with claim 7, wherein the wind turbine includes a lubrication system, said control system further configured to control an operation of the lubrication system based on the calculated wear [characteristic] *characteristics*.

9. A monitoring system in accordance with claim 8, further comprising at least one temperature sensor configured to measure a temperature of a lubrication fluid contained within the lubrication system, said control system further configured to control the operation of the lubrication system based on the calculated wear [characteristic] *characteristics* and based on data received from said temperature sensor.

10. A monitoring system in accordance with claim 7, wherein the [wear characteristic] *predicted amount of wear on the component* is based on at least one of a zero crossing amplitude, a zero crossing peak amplitude, a zero crossing rate, an acoustic energy amplitude and an acoustic energy frequency of a signal representative of the measured acoustic emission.

14. A method of monitoring a wind turbine, said method comprising:
    measuring an acoustic emission generated by at least one component of the wind turbine;
    calculating [at least one wear characteristic] *a plurality of wear characteristics* of the component based on the measured acoustic emission, the wear [characteristic] *characteristics* including [at least one of] a current amount of wear on the component, a rate of wear on the component, and a predicted amount of wear on the component, *the rate of wear on the component being based on the calculated amount of wear on the component over a period of time*; and,
    controlling an operation of the wind turbine based on the calculated wear [characteristic] *characteristics*.

15. A method in accordance with claim 14, wherein the wind turbine includes a lubrication system, said method further comprising controlling an operation of the lubrication system based on the calculated wear [characteristic] *characteristics*.

16. A method in accordance with claim 15, wherein the wind turbine further includes at least one temperature sensor, said method further comprising controlling the operation of the lubrication system based on the calculated wear [characteristic] *characteristics* and based on data received from the temperature sensor.

*20. A monitoring system in accordance with claim 1, wherein the at least one component of the wind turbine comprises a support bearing.*

*21. A monitoring system in accordance with claim 1, wherein the at least one component of the wind turbine comprises a gearbox.*

*22. A monitoring system in accordance with claim 1, wherein the at least one component of the wind turbine comprises a yaw drive mechanism.*

*23. A monitoring system in accordance with claim 1, wherein the predicted amount of wear on the component is based on a zero crossing amplitude or a zero crossing peak amplitude.*

24. A method in accordance with claim 14, further comprising receiving signals based on the measured acoustic emissions from at least one other wind turbine and controlling the operation of the wind turbine based on the received signals.

\* \* \* \* \*